United States Patent [19]

Schaefer

[11] Patent Number: 4,846,219

[45] Date of Patent: Jul. 11, 1989

[54] PRESSURE RELIEF BY PASS CONTROL VALVE

[75] Inventor: Christopher E. Schaefer, Centerville, Ohio

[73] Assignee: Parker-Hannifin Corporation, Cleveland, Ohio

[21] Appl. No.: 144,460

[22] Filed: Jan. 15, 1988

[51] Int. Cl.[4] .............................................. F16K 37/00
[52] U.S. Cl. ..................................... 137/557; 251/77;
        236/93 A; 236/94; 236/99 J
[58] Field of Search ................. 137/557, 563; 251/77;
        236/93 A, 94, 99 J, 34.5

[56] References Cited

U.S. PATENT DOCUMENTS

| | | | |
|---|---|---|---|
| 3,404,837 | 10/1968 | James | 236/34.5 |
| 3,651,827 | 3/1972 | Hammer et al. | 137/469 |
| 3,754,706 | 8/1973 | Tao | 236/99 J X |
| 4,423,751 | 1/1984 | Roettgen | 137/557 |
| 4,469,275 | 9/1984 | De Salve | 236/93 A |
| 4,498,495 | 2/1985 | Worwood et al. | 137/557 |
| 4,508,132 | 4/1985 | Mayfield, Jr. et al. | 251/77 X |
| 4,574,836 | 3/1986 | Barnard, Jr. | 137/553 |
| 4,654,140 | 3/1987 | Chen | 210/90 |

Primary Examiner—John Rivell
Attorney, Agent, or Firm—J. E. Beringer; Ralph E. Jocke

[57] ABSTRACT

A pressure relief by-pass control valve in a system flowing fluid of changing temperature. The vale incorporates a signalling mechanism to indicate when differential pressures have put the valve in a by-passing mode, including an indicator button displaceable by a valve member in moving toward an open position. Temperature responsive structure closes and opens a gap in the connection between the valve member and the indicator button. As used with a heat exchanger, the valve signals the fact of a clogged heat exchanger core, while obviating giving of a false signal when high pressure differentials resulting from low temperature operating conditions occur.

16 Claims, 2 Drawing Sheets

PRESSURE RELIEF BY PASS CONTROL VALVE

BACKGROUND OF THE INVENTION

This invention relates to pressure relief by-pass control valves, especially as used with heat exchangers in oil cooling and like systems. In such systems, should oil flow through the heat exchanger core be unduly restricted or obstructed the pressure relief valve opens a core by-passing route of flow. By this means a continuing flow of oil is assured, despite a blocked heat exchanger core, even though the oil is uncooled, or only partly cooled, and not in its best condition for use. Also, a build-up of very high, potentially damaging, oil pressure is avoided.

In some arts, as in the field of aerospace, the course of development of heat exchangers has been in the direction of giving these devices compact, high performance characteristics with the view of putting the greatest amount of heat transfer surface in the smallest possible space. Heat exchanger cores are made to a very dense construction with only narrow sometimes circuituous passages provided for flow of the confined oil or other fluid to be cooled. A maximum permitted oil pressure drop across the core is set by design specifications and at or about that pressure differential level the pressure relief valve opens. In normal circumstances, the maximum permitted pressure drop is exceeded under cold, start-up conditions when oil viscosity is high. The pressure relief valve opens under these conditions but recloses when rising oil temperatures and lowered oil viscosities reduce the resistance to flow through the narrow passages of the core. An abnormal flow condition arises when narrow core passages become blocked, as by foreign material entrained with the oil or by a build-up of substances on the heat transfer surface drawn from the oil itself. As this clogging condition develops, the pressure drop across the core rises and the pressure relief valve opens, placing the system in a constant by-pass mode.

It is desirable that some means be provided to signal the fact of an open by-pass valve. Operating entities supplied with or using the flowing oil may have a limited functioning time using uncooled oil. It is further desirable, however, that normal valve opening movements, as during a system warm-up operation, may not be recognized as signalling a malfunction.

Heat exchangers with pressure relief by-pass control valves are commonly known and used in the prior art. I am not aware of valves of this kind adapted to signal the fact of a blocked heat exchanger core, nor am I further aware of signalling mechanisms capable of distinguishing between valve movement caused by a blocked heat exchanger core and valve movement occurring normally, as in warm-up operation.

I am aware of prior art filtering systems where a clogged filter is by-passed, with an indicating mechanism being activated to signal a switch to the by-pass mode. Examples of these syssystems are found in U.S. Pat. Nos.:

| Hammer et al | 3,651,827 | 3-28-72 |
| Worwood et al | 4,498,495 | 2-12-85 |
| Barnard, Jr. | 4,574,836 | 3-11-86 |
| Chen | 4,654,140 | 3-31-87 | p All of the reference teaching are concerned with magnetic activation of an indicating mechanism. Only one thereof, namely Chen, takes up the problem of suppressing false signals, that is, signals occurring as a function of low temperature—high viscosity conditions rather than in consequence of a blocked filter. Chen proposes to solve this problem through use of a lock-out principle of operation. A magnet controlled indicator button is held by a bimetal arm from being projected to a signalling position until fluid temperatures reach normal operating levels.

Thermostatically controlled by-pass valves also are known, including De Salve U.S. Pat. No. 4,469,275, dated 9-4-84 showing a "pop-up" indicator signalling a failed thermostat.

SUMMARY OF THE INVENTION

The instant invention provides a pressure relief by-pass control valve incorporating valve operated means to give external indication when the by-pass valve is in an open position. Temperature responsive means comprised in to form a part of the valve makes valve movement effective and ineffective to project an indicator means, depending upon the temperature of the fluid being controlled. The arrangement adapts the valve particularly for use with a heat exchanger where it is desired to signal the fact of a blocked heat exchanger core, without giving false signals when an opening by-pass valve is a function of cold start-up and like operations.

In an invention embodiment a valve member and a visual indicator are mounted in a valve body to form a unitary assembly. The device is adapted to be installed in the manifold of a heat exchanger so as to be affected by the temperature of the flowing fluid and to control by-passing flow. The visual indicator has the characteristic of an indicator button recessed into an end of the valve body projecting from the manifold. The valve has a poppet portion and a stem portion, the latter being received in an opposite end of the valve body in line with the indicator button. A connection between the valve stem and the indicator button provides for displacement of the latter when the valve lifts to an open or by-pass position. However, such connection includes a thermal means responding to fluid temperature change to vary the effective length of the valve stem. In a low range of fluid temperatures a valve opening movement is unable to effect a displacement of the indicator button. A displaced or actuated indicator button may be manually reset. A yielding detent means holds the button in a displaced position so that an existing problem will be continuously signalled until corrected.

An object of the invention is to provide a pressure relief by-pass control valve substantially in accordance with the foregoing.

Other objects and structural details of the invention will appear from the following description when read in connection with the accompanying drawing, wherein.

Figure 1:
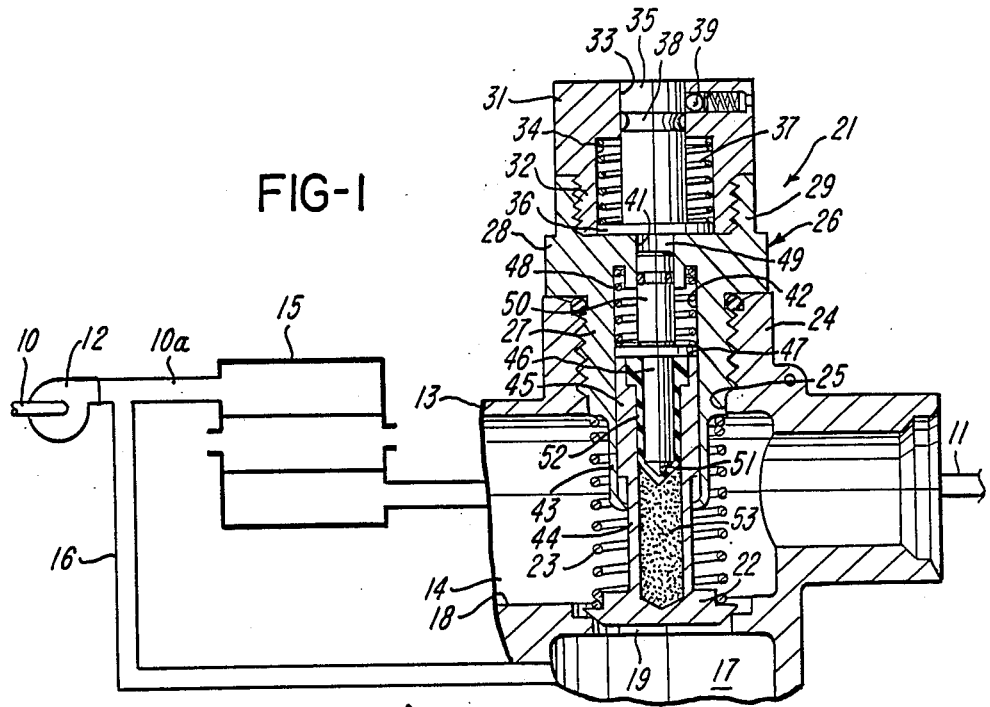
FIG. 1 is a sectional view, partly diagrammatic in form, of a pressure relief valve according to the illustrative invention embodiment. Some system components are included and the valve is shown as it appears with no fluid pressure applied and with fluid temperatures in a low range.
Figure 3:
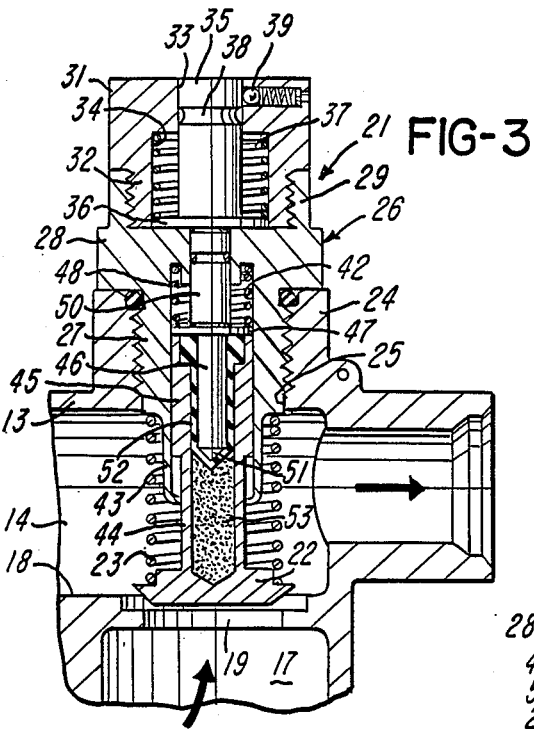
Figure 4:
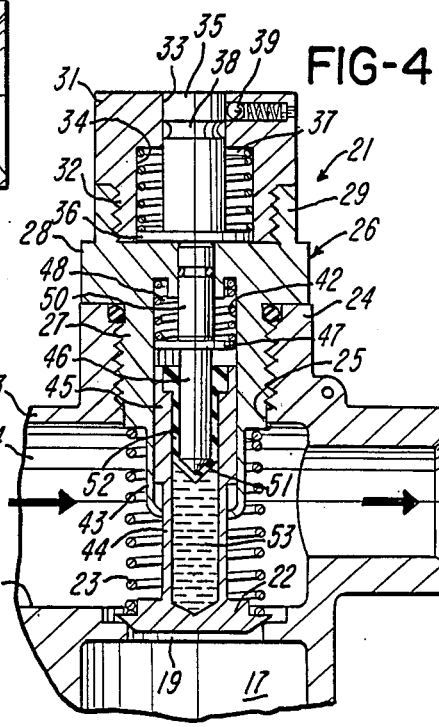
Figure 5:
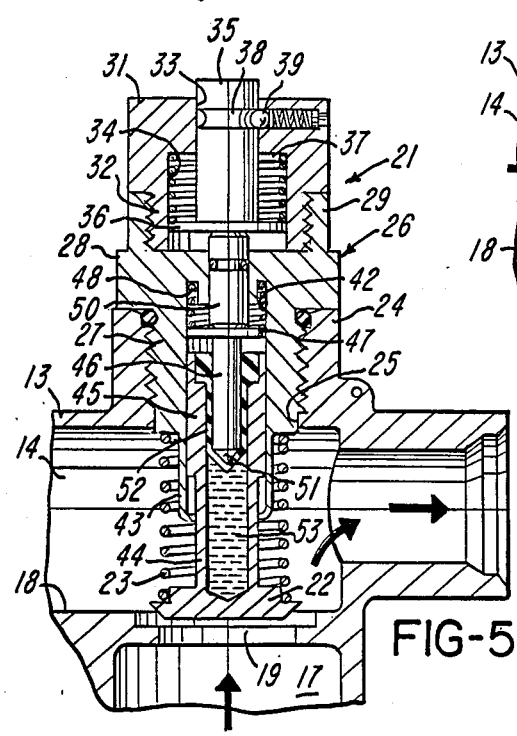

FIG. 3 is a view like FIG. 1, showing the valve as it appears in cold operating conditions, the relief valve FIG. 4 is a view like FIG. 3, the valve being shown as it appears under normal operating conditions, that is, with the by-pass valve closed and the valve stem thermally extended to effect displacement of the indicator button should the valve be forced open, and FIG. 5 is a view like FIG. 4, showing the relief valve assembly as it appears when the valve has been forced open under normal operating conditions.

Referring to the drawings, a pressure relief by-pass control valve according to the illustrative embodiment of the invention is disclosed as a part of a heat exchanger assembly functioning to cool flowing oil. In the oil flowing system, which includes an inlet line 10 and an outlet line 11, a pump 12 directs the oil under pressure to and through a manifold casting 13 which provides a through flow passage 14. An extension 10a of inlet line 10 leads directly to through passage 14 and includes a heat exchanger 15. A by-pass line 16 communicates with line 10a beyond pump 12, and in advance of heat exchanger 15, and extends to a chamber 17 in the manifold casting 13. A casting wall 18 separates chamber 17 from through passage 14 and has formed therein an aperture 19. As will be evident, flow line 16, chamber 17, and aperture 19 constitute an alternate route of flow for pumped oil whereby it can reach through passage 14 and outlet line 11 in a by-passing relation to the heat exchanger.

A valve assembly 21 is installed in the manifold casting 13 and includes a poppet valve 22 adapted to seat in to close the aperture 19. A compression spring 23 urges the valve 22 to a seated or closed position. The arrangement, as will hereinafter more clearly appear, is one in which by passing flow by way of line 16 is normally denied. A pressure differential between chamber 17 and through passage 14 sufficient to overcome spring 23 allows valve 22 to lift from its seat and permits a by-passing flow of some or all of the pumped oil.

The installation of valve assembly 21 is through a casting boss 24 and through an opening 25 in the bottom of such boss. Opening 25 aligns with aperture 19. The valve assembly comprises, in addition to poppet 22 and spring 23, a valve body 26 including a cylindrical portion 27 having a screw threaded connection in boss 24. The body 26 further includes a radial flange 28 adapted to limit against the outer end of boss 24. A boss-like extension 29 on flange 28 provides for the mounting of a cap 31 to what may be considered the outer end of the valve body. The cap 31 has an axially projecting portion 32 having a screw fit in boss 29 and seating to the flat upper surface of flange 28. In the cap 31, is a through bore 33 and a counterbore 34. A signalling member or indicator button 35 is slidable in bore 33 and includes at its inner end a flange 36 guided in counterbore 34. A spring 37 is confined in counterbore 34 to bear upon flange 36 and urge it to a seat on the flat upper surface of flange 28. The length of member 35 is such that when seated to flange 28 the member is wholly contained within, or recessed in bore 33. Displacement of the member upwardly or outwardly, against the urging of spring 37, projects a portion of the member out of the bore 33 where it provides visual evidence that displacement of the indicator button has occurred. The button has a peripheral groove 38 engageable by a spring urged ball detent 39 whereby the indicator button may be releasably held in a projected or signalling position. When the force applied to displace the indicator button has been relieved, the button may be depressed manually to overcome detent 39 and restore the button to control of spring 37. The indicator button has thus an ability to maintain a displaced position, with a "press to reset" capability.

The valve body 26 further has a through bore 41 and a counterbore 42, aligning with bore 33 in cap 31. The former opens through the flat upper surface of flange 28. The latter extends through cylindrical portion 27, and through a reduced diameter extension 43 thereof, which, in an installed position of the valve assembly, terminates within through manifold passage 14. The compression spring 23 surrounds extension 43, being interposed between poppet 22 and a shoulder on cylindrical portion 27 at the base of extension 43. At its outer extremity, extension 43 is turned radially inward in a retaining relation to a valve stem 44. The latter has a unitary relation to poppet 22 and extends into the valve body, where an enlarged portion 45 has a sliding fit in counterbore 42.

Rearwardly or outwardly of its attachment to poppet 22, the valve stem 44-45 has a hollow or tubular construction. Received in what may be regarded as its inner end, or that end opposite poppet 22, is a drive pin 46. At one end thereof is a flange 47 overlying the inner end of the valve stem. A compression spring 48 is confined in counterbore 42 and presses the flange 47 to a seat on the end of the valve stem. An interponent pin 50 is slidable in bore 41 intermediately of flange 47 of the drive pin 46 and flange 36 of the indicator button 35. Along with the drive pin it provides an actuating connection between the valve stem and the indicator button whereby a lifting or opening movement of the poppet 22 may be utilized to displace the button 35 to an indicating position. The length of the interponent pin is such, however, that the described connection includes a gap 49. Therefore, with the parts positioned as shown in FIG. 1, a lifting motion of the valve away from its seat on wall 18 will displace interponent pin 50 toward indicator button 35 to close the gap 49 but will be without effect on the indicator button.

The drive pin 46 extends within the tubular valve stem toward poppet 22. An interior end thereof has a tapered nose 51. A flexible rubber or rubber-like boot 52 surrounds the drive pin and is anchored in the inner end of the valve stem. The drive pin and its surrounding boot, and the poppet 22, define between them, within the valve stem, a cavity filled with an expansible heat sensitive or thermal material 53. The material 53 is a commercially available wax based substance prepared to specific formulations according to temperature ranges in which it is to be used. It is known by several trade names, for example "Vermalite" and has early disclosures in the patents of Sergius, Vernet, including U.S. Pat. Nos. 2,289,846 and 2,915,899. Normally in a substantially solid form, the material 53 changes state at a selected high temperature. Consequent forces of expansion are applied at the tapered nose of the drive pin in an axial extension of the pin to act through interponent pin 50 to close the gap 49. That part of the valve stem containing the thermal material 53 intersects through passage 14. The thermal material accordingly is sensitive to and responds to changes in the temperature of the oil flowing through passage 14. At cold or relatively low operating temperatures the thermal material 53 is in a solid state and is held compressed by the spring 48. As the temperature of the oil flowing through passage 14 rises to and through a critical, predetermined high level, the material 53 changes state to an all or partly liquid form. Relatively powerful forces of expansion are generated, resulting in a projection of the drive pin 50 against the urging of spring 48. As long as the oil temperature remains in a range above the predetermined set level the drive pin will hold its extended position. When the oil temperature drops below the set level, spring 48 is allowed to retract the drive pin, recompressing the thermal material 53.

FIG. 1 shows the parts of the valve assembly in positions assumed when the oil is cold and the pump 12 is not operating. Poppet 22 is closed, drive pin 46 is unextended and the existence of gap 49 is clearly indicated.

FIG. 3 shows the valve assembly as it appears under low temperature or cold start-up conditions. Poppet 22 has been forced open since there is relatively high resistance to flow through the heat exchanger due to high oil viscosity and/or surge effects associated with a start up of pump 12. Thermal material 53 remains unexpanded since oil temperatures are below the set level as which this material changes state. Opening movement of the poppet and of its valve stem has moved interponent pin 50 outwardly to a contacting or approximately contacting relation to the underside of the indicator button 35. The motion has been expended, however, in a closing of gap 49 with minor or no thrust being exerted on the indicator button which remains in its recessed position.

FIG. 4 shows the valve assembly in a position assumed under normal operating conditions. Here the pressure differential across valve 22 has dropped below that necessary to overcome spring 23 and the by-pass route through aperture 19 is closed. All flow is by way of heat exchanger 15. The relatively warm temperature of the oil flowing in passage 14 has caused expansion of thermal material 53. The resultant extension of drive pin 46 has projected interponent pin 50 into approximate contact with the indicator button 35. The button remains unactivated, however, the thermal extension of the drive pin being itself inadequate to apply a lifting thrust to the button. Under normal operating conditions, therefore, pumped oil flows through the heat exchanger and to and through the outlet line 11. The indicator button 35 remains recessed in the valve assembly although an uninterrupted link has been established between the indicator button and poppet 22. Under these circumstances, if valve 22 lifts from its seat to an open position, there will be a direct and positive actuation of the indicator button.

FIG. 5 shows the valve assembly as it appears when, with parts positioning and functioning as shown in FIG. 4, an obstruction to oil flow has formed, as for example, from a clogging of oil passages in the heat exchanger 15. This occurrence finds the drive pin 46 still extended since oil temperatures are at or above normal temperature values. Resistance to flow through the heat exchanger has brought about a rise in the pressure differential between chamber 17 and through passage 14. This has led to a lifting of poppet 22 from its seat on wall 18, opening aperture 19 to by-passing flow. The valve lifting movement has been transmitted through the lifting valve stem, drive pin 46 and interponent pin 50 to the indicator button 35. The indicator button has been projected thereby so that an upper end portion thereof is visible above the cap 31. It is held so projected by engagement of the detent ball 39 in groove 38. A visual indication is given that the system is in a by-passing mode at a time when it should not be so functioning. Moreover, the signal of malfunction will remain in evidence even though the system is shut down.

Figure 2:
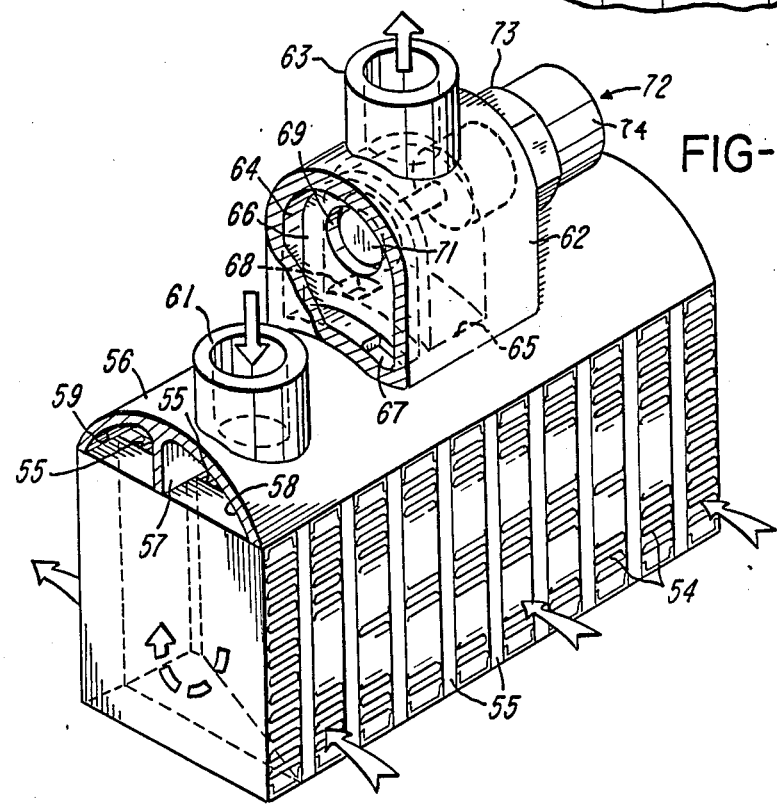
FIG. 2 is a view in perspective, also partly diagrammatic, of a heat exchanger incorporating a valve of the present invention.

FIG. 2 shows a heat exchanger—valve combination utilizing a valve assembly substantially as shown in FIG. 1. A heat exchanger core of a conventional plate and fin type provides air flow passages 54 alternating with oil flow passages 55. The latter open through an upper face of the core, which face is overlaid by a manifold casting 56. The manifold has a longitudinally extending center rib 57 dividing the manifold interior into inlet and outlet chambers 58 and 59. Pumped oil is supplied to the heat exchanger by way of an inlet boss 61 opening into chamber 58. Distributing itself in chamber 58, the incoming oil flows down one side of the several passages 55 and up the other side into outlet chamber 59. From there it has access through a valve housing 62 to an outlet boss 63. The valve housing 62 is, or may be, a part of the manifold casting. It has interior chambers 64 and 65 separated by a wall 66. Inlet manifold chamber 58 communicates with housing chamber 64 through an opening 67. Outlet manifold chamber 59 communicates with housing chamber 65 through an opening 68. The outlet boss 63 overlies and communicates with housing chamber 65. In the housing wall 66 is an aperture 69 by which incoming oil may by-pass the heat exchanger core by flowing from chamber 58 through opening 67 to chamber 64 and then through aperture 69 to chamber 65 and outlet boss 63. A poppet valve 71 controls flow through the operture 69. The valve 71 is part of a valve assembly 72 installed in the housing 62 and which is, or may be, substantially the same as valve assembly 21 of FIG. 1. Thus, the valve poppet 71 is attached to a valve stem slidable in a valve body 73 which is in turn installed in the housing 62. A projecting cap 74 contains the projectible indicator button (not shown) for signalling a system obstruction in the same manner as button 35 of FIG. 1. The valve assembly 72 is effectively the same as valve assembly 21, similarily constructed and installed and similarly operating. Oil manifold casting 13 of FIG. 1 may be regarded as incorporating a valve housing such as part 62 of FIG. 2.

The poppet valve 71 is subject to pressure differences as between housing chambers 64 and 65 in the same manner that poppet valve 22 responds to pressure differences between chamber 17 and through passage 14. Chamber 65 corresponds to through passage 14. Temperature responsive means in the valve stem of assembly 72 operates to the same end and purpose as corresponding means in assembly 21. In each instance the valve stem makes a direct actuation of the indicator button when the valve opens under normal operating conditions but is unable to do so when a valve opening movement is a function of cold start-up or like conditions.

The invention has been disclosed in a preferred embodiment and in a particular practical application. It will be evident that other specific enbodiments and other specific applications are possible and are within the scope of the invention.

What is claimed is:

1. A pressure relief by-pass control valve assembly, including a valve housing providing a through passage for a flowing fluid of changing temperature and an inlet opening to said passage for by-passing fluid flow, valve means installed in said housing normally closing said inlet opening and responding to a predetermined difference in fluid pressure between said inlet opening and said through passage to move to open said inlet opening, means utilizing opening movement of said valve means to signal externally of said housing an open bypass, said means including a lost motion connection whereby an opening movement of said valve means may be without effect on said signalling means, and means influenced by a changing temperature of the flowing fluid to enable and disable said lost motion connection.

2. A valve assembly as in claim 1, said valve means including a valve stem guided for an actuation of said signalling means, said means influenced by a changing fluid temperature operating to vary the effective length of said valve stem.

3. A valve assembly according to claim 2, said valve stem actuating said signalling means through a drive pin extensible and retractable relative to said valve stem, and said means influenced by a changing fluid temperature including thermal means incorporated in said valve stem for extending said drive pin.

4. A valve assembly according to claim 3, said signalling means including an indicator button actuated by opening movement of said valve stem to a position indicating an open by-pass when said valve means move to an open position with said drive pin relatively extended, movement of said valve means to an open position with said drive pin relatively retracted being without effect on said indicator button.

5. A valve assembly according to claim 4, said valve means being installed in said housing with said thermal means in said valve stem positioned to be influenced by a changing temperature of fluid flowing in said through passage.

6. A valve assembly, according to claim 3, and means for biasing said drive pin to a retracted position.

7. A valve assembly according to claim 6, said signalling means including an extensible and retractable indicator button, and detent means for releasably holding said indicator button in an extended position.

8. A pressure relief by-pass control valve assembly, including a valve body for installation in a housing providing passages for flow of a fluid of changing temperature including a by-pass opening, a relatively extensible and retractable signalling member mounted in said body occupying a signalling position when extended, a relatively opposed valve mounted in said body and biased to a position normally closing said by-pass opening, said valve being subject to a pressure induced bodily shifting motion counter to said biasing means to open said by-pass opening, and a connection between said valve and said signalling member utilizing bodily shifting motion of said valve to an open position to engage and extend said signalling member, a part of said connection incorporating temperature responsive means to vary the effective length of said part whereby in one range of fluid temperatures bodily shifting motion of said valve opening said by-pass opening is applied in an extending of said signalling member and in another range of fluid temperatures such motion of said valve is expended in a movement toward said signalling member without extending said member.

9. A valve assembly according to claim 8, said signalling member and said valve being in line with one another, said valve including a stem portion incorporating said temperature responsive means slidable in said body and projected therefrom to be exposed for contact with flowing fluid.

10. A valve assembly according to claim 9, said temperature responsive means including means in said valve stem expanding at temperatures above a predetermined high level and a drive pin extended toward said signalling member by expansion of said expanding means.

11. A valve assembly according to claim 10, the connection between said drive pin and said signalling member including a gap closed by extension of said drive pin.

12. A pressure relief by-pass control valve assembly for installation in a system flowing fluid of changing temperature and operating to open a by-passing flow path for such fluid, including a valve body, a valve member biased to a by-pass closing position and including a valve stem axially movable in said body, said valve member being movable to a by-pass opening position in the course of which said valve stem moves within said body, a member in the path of motion of said valve stem to be displaced thereby as said valve member moves to a by-pass opening position to signal the fact of an open by-pass, and means responding to a changing fluid temperature to vary the effective length of said valve stem to render said valve stem variably effective and ineffective to displace said signalling member.

13. A valve assembly, according to claim 12, said temperature responding means including an expansible thermal means contained in said valve stem, and a drive pin in an inner end of said valve stem extended therefrom by expansion of said thermal means.

14. A valve assembly, according to claim 13, said drive pin and said signalling member being axially aligned and the connection therebetween including a gap closed by extension of said drive pin.

15. A valve assembly, according to claim 14, and yielding means for holding said indicator button in a displaced position, said button being manually depressible to overcome said holding means and reset said button.

16. A valve assembly according to claim 12, said body and said valve member and said signalling member comprising a unitary device in which said body is externally adapted for installation in a housing having fluid flow passages, with said valve member mounted in to extend from an inner end of said body and said signalling member mounted in to be normally recessed within an outer end of said body, displacement of said signalling member to indicate an open by-pass projecting a portion thereof out of said body to be externally visible.

* * * * *